United States Patent [19]

Bement et al.

[11] Patent Number: 4,708,280

[45] Date of Patent: Nov. 24, 1987

[54] TOOL AND PROCESS FOR MINIATURE EXPLOSIVE JOINING OF TUBES

[75] Inventors: Laurence J. Bement, Newport News; James W. Bailey, Tabb, both of Va.

[73] Assignee: The United States of America as represented by the Administrator, National Aeronautics & Space Administration, Washington, D.C.

[21] Appl. No.: 904,812

[22] Filed: Sep. 8, 1986

Related U.S. Application Data

[63] Continuation-in-part of Ser. No. 790,597, Oct. 23, 1985.

[51] Int. Cl.$^4$ .............................................. B23K 20/08
[52] U.S. Cl. .................................... 228/107; 228/2.5; 228/109
[58] Field of Search ................. 228/107, 2.5, 108, 109

[56] References Cited

U.S. PATENT DOCUMENTS

| | | | |
|---|---|---|---|
| 2,212,044 | 8/1940 | Ridley | 228/107 |
| 2,367,206 | 1/1945 | Davis | 228/107 |
| 2,779,279 | 1/1957 | Maiwurm | 228/2.5 |
| 3,025,596 | 3/1962 | Ward et al. | 228/107 |
| 3,036,373 | 5/1962 | Drexelius | 228/107 |
| 3,590,877 | 7/1971 | Leopold | 138/89 |
| 3,724,062 | 4/1973 | Cantrell et al. | 29/523 |
| 3,774,291 | 11/1973 | Snyder et al. | 228/107 |
| 3,790,060 | 2/1974 | Feiss | 228/2.5 |
| 3,848,794 | 11/1974 | Howell | 72/706 |
| 3,910,478 | 10/1975 | Howell et al. | 228/107 |
| 3,987,529 | 10/1976 | Nakagawa et al. | 228/107 |
| 4,003,513 | 1/1977 | Chadwick | 228/107 |
| 4,028,789 | 6/1977 | Loch | 228/107 |
| 4,117,966 | 10/1978 | Green et al. | 228/2.5 |
| 4,272,005 | 6/1981 | Jackson et al. | 228/107 |
| 4,347,790 | 9/1982 | Lizen | 228/2.5 |

FOREIGN PATENT DOCUMENTS

20096  9/1964  Japan .................................. 228/107

OTHER PUBLICATIONS

NASA Technical Memorandum 84649, "Practical Small-Scale Explosive Seam Welding", Apr., 1983.

Primary Examiner—Nicholas P. Godici
Assistant Examiner—Samuel M. Heinrich
Attorney, Agent, or Firm—George F. Helfrich; John R. Manning

[57] ABSTRACT

The invention is a tool and process to be used in explosive joining of tubes. The tool consists of an initiator 81, a tool form 82 and a ribbon explosive 25. The assembled tool 80 is a compact, storable and safe device suitable for explosive joining of small, lightweight tubes down to 0.20 inch in diameter. The invention is inserted into a tube 51 to be welded which tube has itself been inserted into either another tube 52 or a tube plate. A shim or standoff between the two surfaces to be welded is necessary. Initiation of the explosive inside the tube results in a high velocity, angular collision between the mating surfaces. This collision creates surface melts and collision bonding wherein electron-sharing linkups are formed.

5 Claims, 8 Drawing Figures

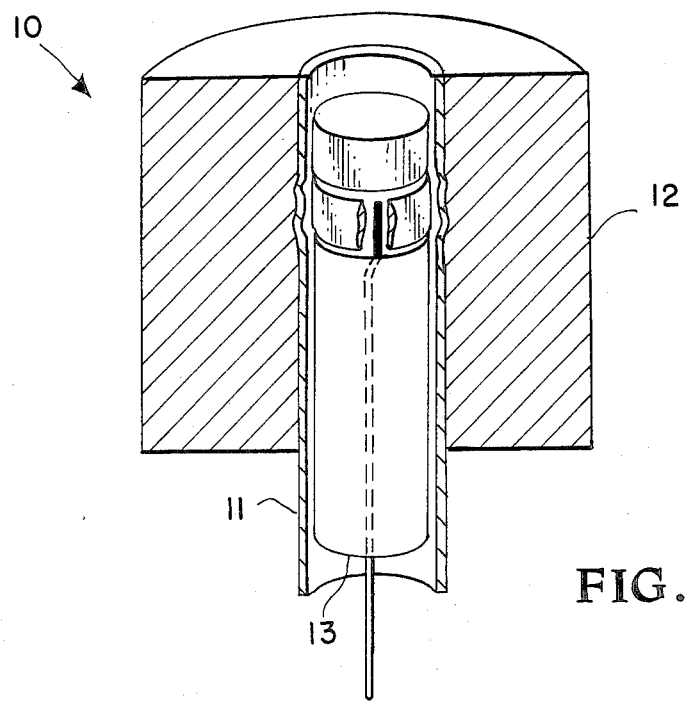
FIG. 1
FIG. 2
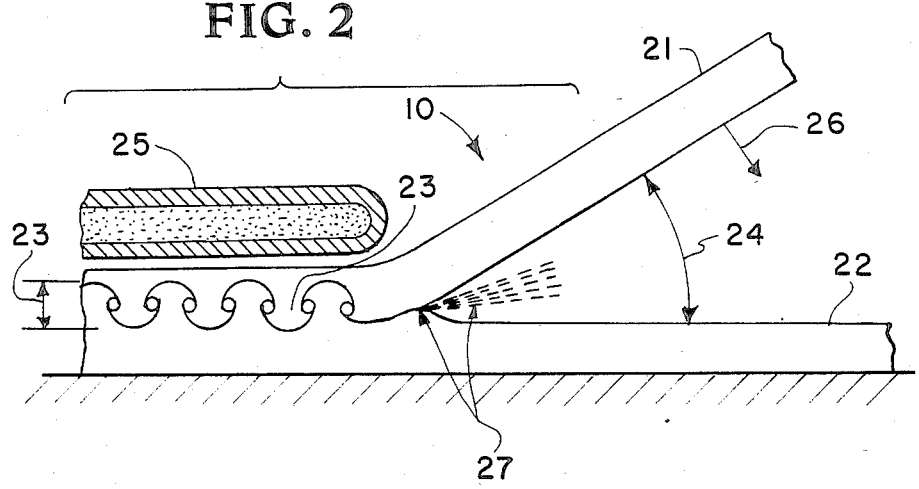

TOOL AND PROCESS FOR MINIATURE EXPLOSIVE JOINING OF TUBES

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

This application is a continuation-in-part of application Ser. No. 790,597, filed Oct. 23, 1985.

TECHNICAL FIELD OF THE INVENTION

The invention is related to the welding, joining and fabricating technology field.

BACKGROUND OF THE INVENTION

This invention relates to joining tools and processes and more particularly to tools and processes for explosive joining of tubes.

Demand is increasing for highly reliable, remote, metal joining processes for hazardous or inaccessible operations such as nuclear reactor repairs or assembly of structures in space. Prior art methods, such as mechanical fasteners, swaging fusion welding, soldering and adhesives have been inadequate due to constraints to hand operations, excessive downtime of the mechanism, inaccessibility of the parts to be joined, insufficient strength, resistance to environments (particularly high temperatures) and other constraints. Only explosive joining offers the characteristics to meet the above requirements. This type of joining produces metallurgical bonds which are impossible to achieve by any other processes. The explosive joining process produces a high velocity, angular collision between the metal surfaces which causes interactomic, electron-sharing linkups to be formed. However, previous methods of explosive joining have had limited suitability due to the necessity of using relatively large amounts of explosive which results in a lack of ability to precisely locate the joint and probable damage to lightweight structures such as small tubes and thin tube plates.

Accordingly, it is an object of the present invention to provide a means of explosive joining which minimizes the amount of explosive required.

Another object of the present invention is to provide a means of explosive joining which allows precise location of the joint.

Yet another object of the present invention is to provide a means of explosive joining which reduces damaging pressure waves, noise nuisance and damage to surrounding structures.

A further object of the present invention is to provide a tool capable of holding an explosive joining means in contact with the internal surface of a tube to be joined.

Still another object of the present invention is to provide a method of explosive joining which uses safe, prepackaged joining devices which are storable and which can be mechanized for use without human contact.

STATEMENT OF THE INVENTION

According to the present invention, the foregoing and additional objects are attained by providing a tool and process for explosive joining of tubes 0.20 inches in diameter and larger. The tool consists of an element, shaped to match the cross-section of the tube to be welded, made of a rigid material which can be either machined or molded. This material can be wood, plastic or paper or for a reusable tool can be metal such as steel. One or more bands of ribbon explosive are wrapped around the tool to form the joining charge. The external circumference of the tool is shaped so as to hold the ribbon explosive in contact with the inner surface of a tube to be welded. The tool also holds an initiation charge (explosive-filled tube or blasting cap). Proper standoff between the tubes to be joined is achieved by either shims or by machining of the contact surfaces. The tool assembly is then inserted within the tube to be joined and fired to complete the joint.

BRIEF DESCRIPTION OF THE DRAWINGS

A more complete appreciation of the present invention and many of the attendant advantages thereof will be readily apparent as the same becomes better understood by reference to the following descriptions when considered in connection with the accompanying drawings wherein:

FIG. 1 is a longitudinal cross-sectional of a joined tube and outer surface showing an unfired tool of the present invention in the joining position.

FIG. 2 is a cross-sectional view of an explosive joining of two metal plates exaggerating the joint depths and impact angles for illustration purposes;

DETAILED DESCRIPTION OF THE INVENTION

Figure 3:
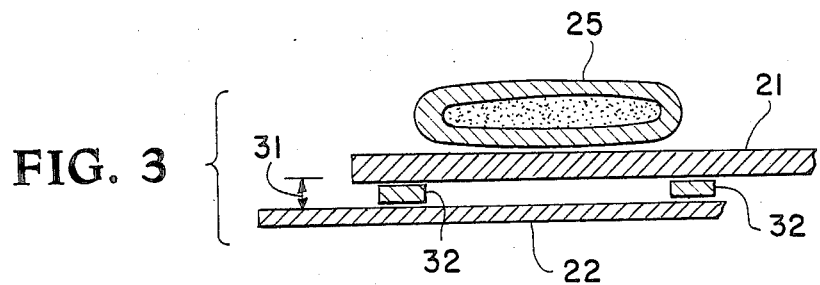
FIG. 3 is a cross-sectional view of two metal plates (or tubes) depicting shims used to achieve the required standoff necessary to set the proper impact angle.

Referring now to the drawings wherein like elements are referred to by the same reference numeral throughout the several views and more particularly to FIG. 1, an explosively bonded joint, designated generally by the numeral 10, is shown in cross-section with the outer surface of inner tube 11 and outer surface 12 bonded together. An unfired tool 13 of the present invention is shown in the welding position.

The physical mechanism of the tool 13 and process can be best understood by reference to FIG. 2, wherein a sectional view depicts the operation of the explosive joint 10 with the surface interaction depth 23 and impact angle 24 between plates 21 and 22 exaggerated for illustrative purposes. Explosive charge 25 is a high energy low-yield sheathed miniature ribbon explosive, such as cyclotrimethylene-trinitramine (RDX), which generates several million pounds of pressure per square inch on top of plate 21. This over pressure creates velocities 26 in plate 21 of several thousand feet per second. On impact with plate 22, this kinetic energy is converted into skin-deep (approximately 0.001 inch)

melts, which are stripped from the surface and squeezed out in jet action 27 by the closing angle 24.

Figure 4:
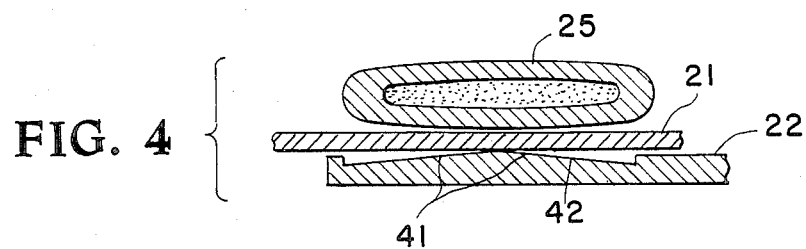
FIG. 4 is a cross-sectional view of two metal plates (or tubes) using a machined groove in the base plate to achieve the required standoff distance.

Generally, the amount of explosive required is affected by plate material and thickness, and by the standoff distance between plates. Referring to FIG. 3, a plate standoff 31 or separation is required to achieve the high velocity, angular collision necessary to effect the bond. This standoff 31 can be achieved by shimming 32, fixturing or machining. Any convenient shim may be used including masking tape. Alternately, a notch may be machined in either or both plates. The plates can be configured to present a parallel interface, or referring to FIG. 4, for maximum efficiency an inverted "V" 41 may be machined in one or both plates 21 and 22 providing an approximate five degree sloping surface 42.

Figure 5:
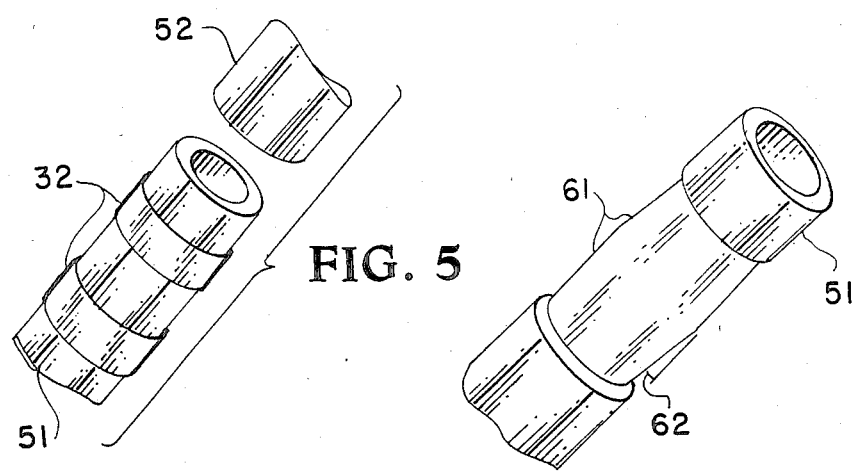
FIG. 5 is a perspective view of a tube with ring shims ready for insertion in an outer tube.

FIG. 5 depicts the shim 32 configured to provide proper standoff between inner tube 51 and outer tube 52. Minimum standoff, approximately 0.010 inch, is required to achieve the required velocity to effect the joint. Maximum standoff, approximately 0.025 inch, is established to minimize material deformation and bending energy losses.

Figure 6:
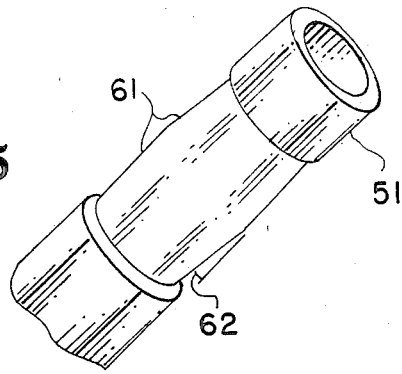
FIG. 6 is a perspective view of a machined tube with circumferential grooving ready for insertion into the outer tube.

Similarly, FIG. 6 shows a machining application to the tube surface. Tube 51 is machined to provide an inverted "V" circumferentially inscribed around the tube. The surface of inverted "V" 61 angles at approximately a five degree slope 62 shown in exaggerated scale for purposes of illustration. The tube wall is maintained a constant thickness throughout the "V" section.

Figure 7:
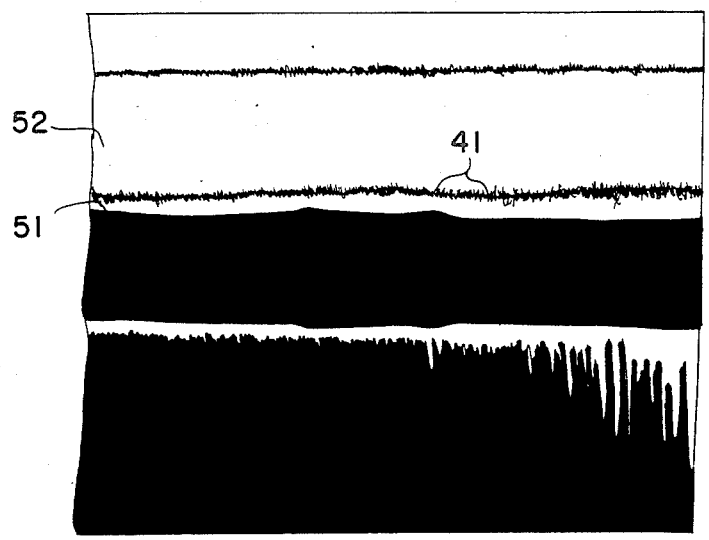
FIG. 7 is a drawing of a photographed section of part of an actual joined sample in which circumferential grooving was machined into the outer tube.

Referring to FIG. 7, a cross-sectional drawing of a photographed test sample shows the completed joint. Inner tube 51 is bonded to outer tube 52 at the inverted "V" 61 location which had been previously machined into the outer surface of inner tube 52.

Figure 8:
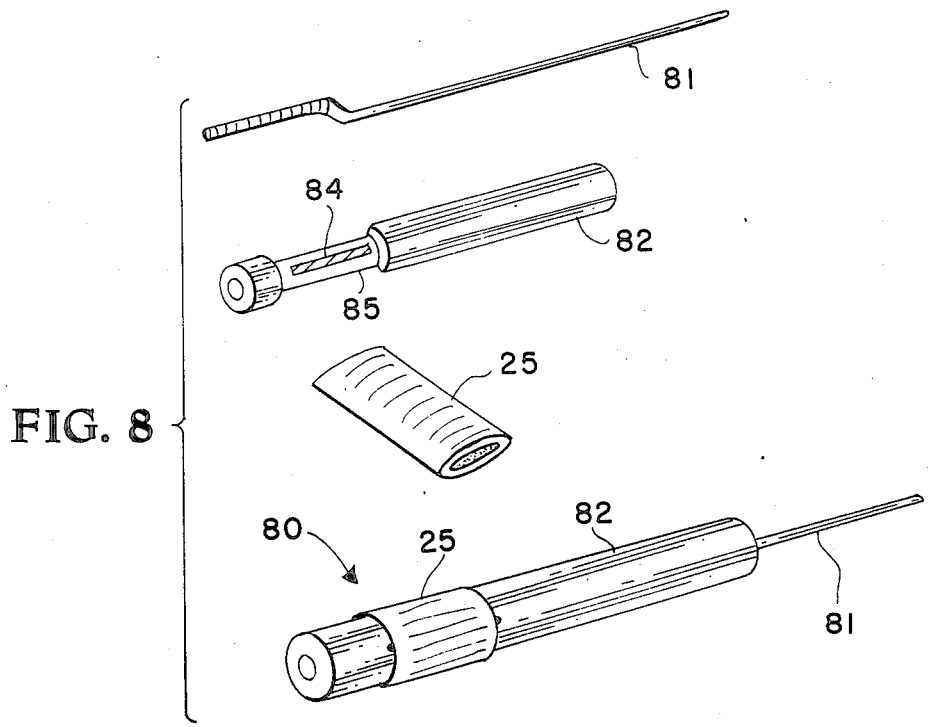
FIG. 8 is a perspective view of the joining tool in various stages of assembly.

Referring to FIG. 8, a depiction of the joining tool, is shown generally by the numeral 80. Three components make up the completed joining tool, the initiator 81 which can also be an electrically initiated blasting cap, the tool form 82, and the low-yield sheathed miniature ribbon explosive 25. Initiator 81 is made up of an 0.090 inch diameter, one-inch long, 0.005 inch wall tube with an 0.500 inch long packed explosive column that is located 0.300 inch from one end of the tube; a tube of 8-grains/foot mild detonating cord is inserted and bonded into the 0.300 inch deep cavity. Tool form 82 is center bored so that initiator 81 may be inserted into the end of the tool form. A slot 84 located at the ribbon explosive holding point 85 receives the end of initiator 81 such that the initiator is held in contact with the ribbon explosive 25. Tool form 82 also has a slight recess at the ribbon explosive holding point 85 so that the ribbon explosive 25 may be pressed flush with the tool surface. Insertion of the initiator 81 into tool form 82, and wrapping of ribbon explosive 25 around the tool form, and and completes the explosive joining tool 80. As packaged in this configuration, the joining tool 80 is storable with a shelf life of around five years. The size of the smallest completed tool is slightly smaller in diameter than an ordinary pencil (0.200 inch) and the length including the initiator can be made any convenient dimension. The ribbon explosive is a secondary explosive which requires an explosion to initiate the ribbon. Impacts, electrical shocks, heat and fire will not cuase the ribbon to explode. Further, the completed tool contains the least amount of explosive which can be used to effect a reliable joint. Compared to prior art the present invention uses less than ten percent of the explosive required for center loaded devices (cylindrical explosive plugs). For example, an 0.625 inch diameter tube using the center load method uses approximately ninety grains of explosive to form a continuous, sealed joint and achieve parent metal strength. This present invention requires only 6.5 grains to achieve the same function. Also, this tool is adaptable to various tube configurations by changing the shape of the tool form. These changes will allow joining of curved tube sections and of other shaped tubes such as square or triangular at any point in a tube length.

OPERATION OF THE INVENTION

The assembly and operation of the joining tool 80 is accomplished by the following steps: (1) Bond mild detonating fuse to initiator 81 using a non-reactive, non-solvent, non-vaporizing adhesive. In the present embodiment, a 3M adhesive "scotch cast" was used; (2) Wrap double-backed tape around tool form 82 at location for attaching ribbon explosive 25; (3) Cut ribbon explosive 25 to length to wrap around tool form 82 over the double-backed tape; (4) Install ribbon 25 on double-backed tape; (5) Insert initiator 81 into tool form 82 by inserting through slot and centerline hole in tool form 82; (6) Trim ends of ribbon explosive 25 with razor blade to produce a tight fit with the tool form 82; (7) Press ribbon explosive 25 into tool form 82 to achieve a flush surface with the initiator 81 explosive load centered on the ribbon explosive 25; (8) Use $0.75 \times 0.002$ inch teflon tape to wrap around ribbon explosive 25 and tool form 82 or approximately 0.020 inch wall thickness heat shrink tubing to increase the diameter of the assembled tool to provide a snug fit to the inside diameter of the tube 51 to be joined; (9) Use $0.5 \times 0.002$ inch teflon tape to wrap around the tool form 82 on both sides of ribbon explosive 25 to bring these areas up to the inside diameter of the steel tube 51 as well as cover the exposed portions of the initiator 81; (10) Insert the tube 51 to be joined to the desired depth into the outer tube 52. Tube 51 must cover the machined area in tube 52 or shimming may be used; (11) Insert the assembled tool 80 into tube 51 and assure that the centerline of the ribbon explosive 25 is directly opposite the peak in the inverted "V" 41 or centered between the shims; (12) Secure assembled tool 80 in position using any convenient means such as taping; (13) Initiate mild detonating fuse 81 by using of blasting cap or initiate blasting cap; and (14) Remove debris from tube by brush or other convenient means.

Although specific embodiments of the invention have been described herein, they are to be considered as exemplary of the novel features thereof and are not exhaustive. There are many variations and modifications of these specific examples which will be readily apparent to those skilled in the art in light of the above teachings without departing from the scope of the appended claims. It is therefore understood that this invention may be practiced otherwise than as specifically described herein.

What is claimed as new and desired to be secured by Letters Patent of the United States is:

1. A joining tool for miniaturized explosive welding of an inner surface to an outer surface comprising:
   an elongated tool form;
   a low-yield sheathed miniature ribbon explosive; and
   an initiator;
   said tool form having a recessed ribbon explosive holding point for receiving the low-yield ribbon explosive and an initiator end suitable for receiving a detonating means, and shaped so as to maintain contact between the ribbon explosive and a surface to be welded;

said low-yield sheathed miniature ribbon explosive being disposed so as to match the area of said surface and the external dimension formed by the recessed ribbon explosive holding point and being uniformly distributed in said ribbon explosive holding point whereby thin concentrations causing the explosion to fizzle and thick concentrations causing excessive pressure to be developed are avoided;

said initiator being inserted into said tool form and received at said recessed ribbon explosive holding point such that the initiator detonating means extends across the complete width of said low-yield sheathed miniature ribbon explosive, whereby the complete cross-section of the ribbon explosive is detonated simultaneously, allowing minimum pressure to be attained and thereby causing the explosion to be self-sustaining.

2. A jointing tool for miniaturized explosive welding of an inner surface to an outer surface as in claim 1 wherein the recessed ribbon explosive holding point is an annular recess around said tool form.

3. A joining tool for miniaturized explosive welding of an inner surface to an outer surface as in claim 1 wherein the low-yield sheathed miniature ribbon explosive is a miniature ribbon of miniature lead-sheathed cyclotrimethelenetrinitramine.

4. A joining tool for miniaturized explosive welding of an inner surface to an outer surface as in claim 1 wherein the tool form is bored axially to accept said initiator and said recessed ribbon explosive holding point is slotted axially so that mating of the initiator detonation means to the complete width of the low-yield sheathed ribbon explosive can be effected.

5. A process for miniature explosive welding of an inner surface to an outer surface which minimizes use of explosives and reduces damaging pressure waves and noise, comprising:

shaping a tool form to match the interior of an inner surface to be welded while maintaining a loose fit;

circumscribing said tool form with a recessed ribbon explosive holding point;

forming a low-yield sheathed miniature ribbon explosive around the outer circumference of said ribbon explosive holding point;

mating said explosive ribbon to a detonating means so that the detonation area extends across the complete width of the explosive ribbon;

forming the above tool assembly into an integral unit;

providing stand off means between the inner surface and the outer surface to be welded;

positioning the inner surface to be welded inside an outer surface;

inserting said tool assembly into said inner surface to be welded and positioning the tool assembly so as to center the explosives over the stand off means; and initiating the low-yield ribbon explosive with the detonating means to effect a joint.

* * * * *